US011254199B2

(12) United States Patent
Brehmer et al.

(10) Patent No.: US 11,254,199 B2
(45) Date of Patent: Feb. 22, 2022

(54) TRANSMISSION FOR A MOTOR VEHICLE, DRIVE TRAIN AND METHOD FOR OPERATING A TRANSMISSION

(71) Applicant: ZF Friedrichshafen AG, Friedrichshafen (DE)

(72) Inventors: Martin Brehmer, Tettnang (DE); Stefan Beck, Eriskirch (DE); Anton Fritzer, Markdorf (DE); Suryanto Hendrawan, Constance (DE); Matthias Horn, Tettnang (DE); Johannes Kaltenbach, Friedrichshafen (DE); Raffael Kuberczyk, Ravensburg (DE); Jens Moraw, Markdorf (DE); Gerhard Niederbrucker, Friedrichshafen (DE); Martin Rattay, Wernigerode (DE); Matthias Reisch, Ravensburg (DE); Wolfgang Rieger, Friedrichshafen (DE); Thomas Rosemeier, Meckenbeuren (DE); Lara Ruth Turner, Immenstaad (DE); Bernd Unseld, Ravensburg (DE); Viktor Warth, Friedrichshafen (DE); Michael Wechs, Weißensberg (DE); Peter Ziemer, Tettnang (DE); Oliver Bayer, Hörbranz (AT)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/770,456

(22) PCT Filed: Dec. 5, 2018

(86) PCT No.: PCT/EP2018/083561
§ 371 (c)(1),
(2) Date: Jun. 5, 2020

(87) PCT Pub. No.: WO2019/110626
PCT Pub. Date: Jun. 13, 2019

(65) Prior Publication Data
US 2021/0162984 A1 Jun. 3, 2021

(30) Foreign Application Priority Data
Dec. 8, 2017 (DE) .................... 10 2017 222 300.6

(51) Int. Cl.
*B60K 6/365* (2007.10)
*B60W 10/08* (2006.01)
(Continued)

(52) U.S. Cl.
CPC ............ *B60K 6/365* (2013.01); *B60W 10/08* (2013.01); *B60W 10/115* (2013.01); *F16H 3/66* (2013.01);
(Continued)

(58) Field of Classification Search
None
See application file for complete search history.

(56) References Cited

U.S. PATENT DOCUMENTS 7,828,096 B2 11/2010 Hoher et al.
10,195,932 B2 2/2019 Brehmer et al.

FOREIGN PATENT DOCUMENTS

DE 102004038516 2/2006
DE 102006033087 1/2008
(Continued)

OTHER PUBLICATIONS

Translated Written Opinion for EP '561 (Year: 2020).*
(Continued)

*Primary Examiner* — Dirk Wright
(74) *Attorney, Agent, or Firm* — Dority & Manning, P.A.

G GG S4 S5 GW2 GG S EM R S3 GG ZS S2 P1 P2 P3 GW1 E2 S6 S1 E1

(57) ABSTRACT

A transmission (G) includes an input shaft (GW1), an output shaft (GW2), an electric machine (EM), a plurality of planetary gear sets (P1-P3; 2P1-2P5), and gear-implementing shift elements (S1-S6; 2S1-2S5). Via engagement of a first of the gear-implementing shift elements (S1, 2S1), which is a force-locking shift element having a variable torque transmission capacity, the input shaft (GW1) and an element (E1, 22E1) of one of the planetary gear sets (P3; 2P4) can be brought into a fixed rotational speed relationship with respect to each other. Another element (E2, 22E2*a*, 22E2*b*) of one of the planetary gear sets (P1, 2P3, 2P5) is permanently connected to a rotor (R) of the electric machine (EM). By engaging an auxiliary shift element (ZS, 2ZSa, 2ZSb), which is a form-locking shift element, the rotor (R) and the input shaft (GW1) can be brought into a fixed rotational speed relationship with respect to each other.

12 Claims, 6 Drawing Sheets

(51) Int. Cl.

*B60W 10/115* (2012.01)
*F16H 3/66* (2006.01)

(52) U.S. Cl.

CPC .. *F16H 2200/006* (2013.01); *F16H 2200/201* (2013.01); *F16H 2200/2046* (2013.01); *F16H 2200/2064* (2013.01); *F16H 2200/2094* (2013.01)

(56) References Cited

FOREIGN PATENT DOCUMENTS

| | | | | | |
|---|---|---|---|---|---|
| DE | 102013201182 | | | 7/2014 | |
| DE | 102014226699 | | | 6/2016 | |
| DE | 102015204573 | | | 9/2016 | |
| DE | 102015210248 | A1 | * | 12/2016 | B60K 6/547 |
| DE | 102015210251 | A1 | * | 12/2016 | B60K 6/48 |
| DE | 102015218990 | | | 4/2017 | |
| WO | WO-2015076068 | A1 | * | 5/2015 | F16H 63/50 |
| WO | WO-2016096313 | A1 | * | 6/2016 | F16H 3/663 |
| WO | WO-2016184626 | A1 | * | 11/2016 | F16H 3/724 |

OTHER PUBLICATIONS

Translated IPR for EP ’561 (Year: 2020).*
English translation of DE ’990 (Year: 2020).*
English translation of DE 248 (Year: 2020).*
Iernational Search Report (English Translation) PCT/EP2018/083561, dated Mar. 11, 2019. (2 pages).

* cited by examiner

S3
GG
GG
S2

E1
P3
S1
GW2
P2
S5
S6
S4
E2
P1
GG
GW1
G
S
EM
R
ZS

| | S6 | S1 | S5 | S3 | S2 | S4 | ZS |
|---|---|---|---|---|---|---|---|
| 1 | ● | | | ● | | ● | ● |
| 2 | | | ● | ● | | ● | ● |
| 3 | ● | | ● | ● | | | ● |
| 4 | | ● | ● | ● | | | ● |
| 5 | ● | ● | | ● | | | ● |
| 6 | ● | ● | ● | | | | ● |
| 7 | ● | ● | | | | ● | ● |
| 8 | | ● | ● | | | ● | ● |
| 1R | ● | | ● | | ● | | ● |
| 1E1 | ● | | | ● | | ● | |
| 1E2 | | | ● | ● | | ● | |
| 1E3 | ● | | ● | ● | | | |
| 1E4 | ● | | ● | | ● | | |
| 1E5 | ● | | | ● | ● | | |
| 1E6 | ● | | | | ● | ● | |

2P4
2S1
2S3
2E2a
2P2
2P3
2S4
2P1
2S5
GW2
GG
E4
2P5
2ZSb
G
GW1
S
EM
R
22E2b
E3
GG

|  | 2S5 | 2S2 | 2S1 | 2S4 | 2S3 | 2ZSa 2ZSb |
|---|---|---|---|---|---|---|
| 21 | ● | ● | ● |  |  | ● |
| 22 | ● | ● |  |  | ● | ● |
| 23 |  | ● | ● |  | ● | ● |
| 24 |  | ● |  | ● | ● | ● |
| 25 |  | ● | ● | ● |  | ● |
| 26 |  |  | ● | ● | ● | ● |
| 27 | ● |  | ● | ● |  | ● |
| 28 | ● |  |  | ● | ● | ● |
| 2R | ● | ● |  | ● |  | ● |
| 2E1 | ● | ● |  |  | ● |  |
| 2E2 |  | ● |  | ● | ● |  |
| 2E3 | ● |  |  | ● | ● |  |
| 2E4 | ● | ● |  | ● |  |  |

Fig. 5

TRANSMISSION FOR A MOTOR VEHICLE, DRIVE TRAIN AND METHOD FOR OPERATING A TRANSMISSION

CROSS-REFERENCE TO RELATED APPLICATIONS

The present application is related and has right of priority to PCT Publication No. WO 2019/110626 filed on Dec. 5, 2018 and to German Patent Application No. 10 2017 222 300.6 filed on Dec. 8, 2017, both of which are incorporated by reference in their entirety for all purposes.

FIELD OF THE INVENTION

The invention relates to generally a transmission for a motor vehicle. The invention further relates generally to a drive train for a motor vehicle including such a transmission, and to a method for operating such a transmission or such a drive train.

BACKGROUND

Patent application DE 10 2004 038 516 A1 describes a type of transmission, which includes an input shaft, an output shaft, three planetary gear sets, and six shift elements. By selective engagement of three of the six shift elements, multiple gears can be formed between the input shaft and the output shaft.

It is known from patent application DE 10 2006 033 087 A1 to connect an electric machine to the input shaft of a transmission, in order to drive a motor vehicle, which is equipped with the transmission, with the aid of the electric machine. In order not to entrain an internal combustion engine of the motor vehicle in the case of such an electric drive, a clutch is provided, which disconnects the internal combustion engine from the input shaft. This clutch increases the amount of installation space required by the transmission.

Patent application DE 10 2014 226 699 A1 provides an alternative connection of the electric motor to the transmission. The electric motor is connected to a gear set element of the transmission, which is connected to the input shaft via a multi-disk clutch. The multi-disk clutch acts simultaneously as a gear-implementing shift element. By maintaining the disengagement of this clutch, an internal combustion engine connected to the input shaft is not entrained during a driving operation with the aid of the electric motor. This limits the number of gear steps, however, which are available for such an electric drive.

SUMMARY OF THE INVENTION

One example object of the invention is to provide a transmission, which is distinguished, on the one hand, by compact outer dimensions and, on the other hand, by a greater availability of the electric drive. One further object is to provide a suitable operating method for such a transmission.

In this case, a transmission refers, in particular, to a multi-stage transmission, in which a multitude of gears, i.e., fixed translation ratios between the input shaft and the output shaft of the transmission, are preferably automatically engageable with the aid of gear-implementing shift elements. The gear-implementing shift elements are, for example, clutches or brakes. Such transmissions are utilized primarily in motor vehicles in order to adapt the rotational speed characteristic and the torque output characteristic of the drive unit to the driving resistances of the vehicle in a suitable way.

A transmission for a motor vehicle is provided, which includes an input shaft, an output shaft, an electric machine, multiple gear-implementing shift elements, a plurality of planetary gear sets, as well as a torque-transmitting interface to a transmission-external internal combustion engine. The torque-transmitting interface can be, for example, a spline or a flange. The transmission is configured for providing a plurality of gears between the input shaft and the output shaft via selective engagement of the gear-implementing shift elements.

The torque-transmitting interface to the transmission-external internal combustion engine is connected to the input shaft in a permanently rotationally fixed or torsionally elastic manner. In other words, an engageable clutch is not provided between the interface and the input shaft. One or multiple torsional vibration dampers and/or a centrifugal pendulum absorber can be provided, in order to make the torsionally elastic connection available.

By engaging a first of the gear-implementing shift elements, the input shaft and an element of one of the planetary gear sets are brought into a fixed rotational speed relationship with respect to one another. In other words, a speed ratio between the aforementioned element and the input shaft is always constant in the engaged condition of the first gear-implementing shift element. The speed ratio can assume the value one or values deviating therefrom. If the first gear-implementing shift element is disengaged, there is no forced relationship between the rotational speeds of the aforementioned element and the input shaft. The first gear-implementing shift element is designed as a force-locking shift element having a variable torque transmission capacity, i.e., for example, as a lamellar shift element.

Another element of one of the planetary gear sets is permanently connected to a rotor of the electric machine. A permanent connection is referred to as a connection that always exists between two elements. Elements which are permanently connected in such a way always rotate with the same dependence between their speeds. A shift element must not be located in a permanent connection between two elements. A permanent connection is therefore to be distinguished from an engageable connection.

According to example aspects of the invention, an auxiliary shift element designed as a form-locking shift element is provided, for example, a shifting dog. By engaging the auxiliary shift element, the rotor and the input shaft are brought into a fixed rotational speed relationship with respect to each other. The speed ratio can assume the value one or values deviating therefrom. If the auxiliary shift element is disengaged, there is no forced relationship between the rotational speeds of the aforementioned other elements and the input shaft.

The auxiliary shift element provided in addition to the gear-implementing shift elements has a low installation space requirement due to the design as a form-locking shift element. For a drive with the aid of the electric machine without simultaneously driving the input shaft, the first gear-implementing shift element is to be held in a disengaged condition. Since the rotor acts upon a gear set element other than the first gear-implementing shift element, however, the availability of the transmission for driving the output shaft with the aid of the electric machine without simultaneously driving the input shaft can be improved.

Preferably there is no permanent connection between the input shaft and the planetary gear sets. In other words, only one engageable connection is provided between the input shaft and the planetary gear sets. Multiple engageable connections between the input shaft and the planetary gear sets can also be provided. As a result, the availability of the transmission for driving the output shaft with the aid of the electric machine without simultaneously driving the input shaft can be improved.

Alternatively, a permanent connection can exist between the input shaft and an element of one of the planetary gear sets. In this case, another element of the same planetary gear set can be rotationally fixed by engaging the auxiliary shift element. The auxiliary shift element is therefore designed as a brake, whereby the design complexity of the transmission can be reduced. Only by engaging the auxiliary shift element is torque transmitted between the elements of the involved planetary gear set, which preferably includes the element, to which the rotor is permanently connected.

The transmission can be an integral part of a drive train for a motor vehicle. The drive train includes an internal combustion engine in addition to the transmission. The output shaft of the transmission can be operatively connected to a transmission-internal or transmission-external differential gear, which is operatively connected to wheels of the motor vehicle. Such a drive train allows for multiple drive modes of the motor vehicle. In an electric mode, the motor vehicle is driven by the electric machine of the transmission. In an internal combustion engine-operated mode, the motor vehicle is driven by the internal combustion engine. In a hybrid mode, the motor vehicle is driven by the internal combustion engine as well as by the electric machine of the transmission.

The transmission is configured for providing a plurality of gears between the input shaft and the output shaft via selective engagement of the gear-implementing shift elements. According to one preferred example operating method, the auxiliary shift element is engaged in all these gears. As a result, it is ensured that the electric machine can deliver power to and receive power from the drive train in all these gears.

The transmission is configured for providing at least one gear step between the rotor and the output shaft via selective engagement of a selection of the gear-implementing shift elements. Preferably, multiple such gear steps can be provided between the rotor and the output shaft. According to one preferred example operating method, the auxiliary shift element is disengaged in the at least one gear step, preferably in all the gear steps.

Starting from an operation of the transmission in an aforementioned gear step, an internal combustion engine connected to the input shaft in a torsionally elastic manner can be accelerated from the stationary condition to a starting speed, in that the first gear-implementing shift element is at least partially engaged. As a result, the internal combustion engine can be started.

According to one preferred example embodiment, the first gear-implementing shift element is completely engaged only for the case in which the auxiliary shift element is engaged after the internal combustion engine has been accelerated to the starting speed. "Completely engaged" is understood to mean an operation in which the shift element is actuated in such a way that it transmits a large amount of torque in the presence of no or only a slight differential speed. In contrast thereto, in the case of a partial engagement of the shift element, the development of a differential speed is expressly desirable, for example, greater than thirty (30) revolutions per minute. For the engagement of the auxiliary shift element, the transmission elements connected via the auxiliary shift element must have the same rotational speed. The synchronization necessary therefor can take place via an appropriate open-loop control of the internal combustion engine and/or the electric machine.

Preferably, the complete engagement of the first gear-implementing shift element takes place as part of a gear change operation of the transmission, in which one more of the gear-implementing shift elements is disengaged. As a result, starting from the previously engaged gear step, a shift, for example, to a higher gear can take place, in order to keep a rotational speed of the internal combustion engine low.

According to one alternative example embodiment, the first gear-implementing shift element is completely engaged after the acceleration of the internal combustion engine to the starting speed, wherein, subsequently, one of the gear-implementing shift elements involved in the previously engaged gear step is disengaged. The auxiliary shift element remains disengaged in this case. As a result, starting from a purely electric drive of the output shaft, a switch can take place into a hybrid operating mode, in which a power distribution between the output shaft, the internal combustion engine, and the electric machine takes place. In such an operating mode, an infinitely variable operation of the transmission is possible.

For the open-loop control of the aforementioned methods, an electronic control device can be provided, which has a communication link at least to the transmission, preferably also to the internal combustion engine.

BRIEF DESCRIPTION OF THE DRAWINGS

Exemplary embodiments of the invention are described in detail in the following with reference to the attached figures. Wherein:

FIG. 2 shows a shift pattern for the transmission according to the first exemplary embodiment;

FIG. 5 shows a shift pattern for the transmission according to the second and third exemplary embodiments.

DETAILED DESCRIPTION

Figure 1:
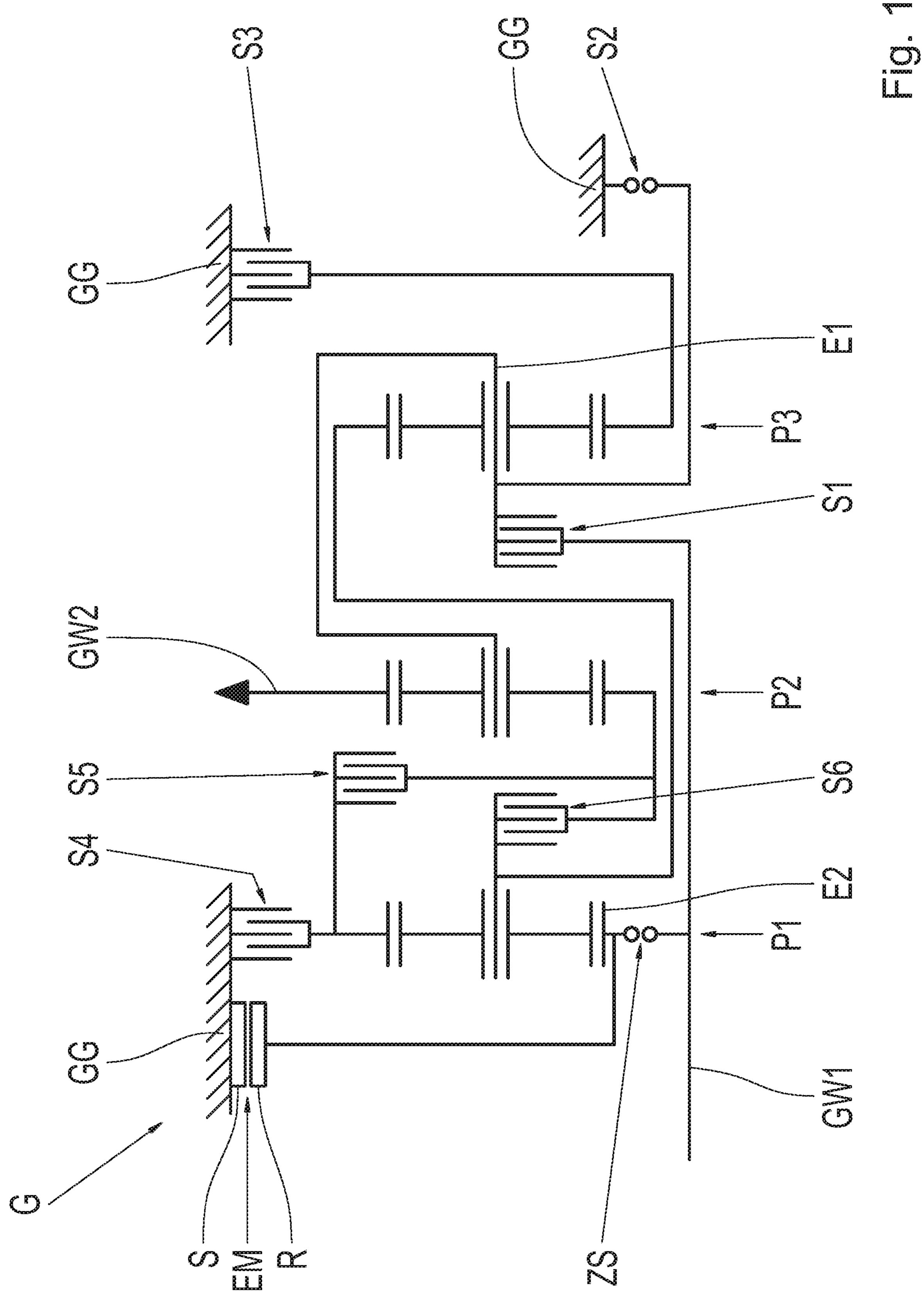
FIG. 1 shows a transmission according to a first exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a transmission G according to a first exemplary embodiment of the invention. The transmission G includes an input shaft GW1, an output shaft GW2, a first planetary gear set P1, a second planetary gear set P2, a third planetary gear set P3, and an electric machine EM. The electric machine EM includes a rotationally fixed stator S and a rotary rotor R.

The input shaft GW1 is not permanently connected to any of the planetary gear sets P1, P2, P3. Instead, the input shaft GW1 is connectable, via engagement of a first gear-implementing shift element S1, to a carrier E1 of the third planetary gear set P3, which is permanently connected to a carrier of the second planetary gear set P2. A carrier of the first planetary gear set P1 is permanently connected to a ring gear of the third planetary gear set P3. The output shaft GW2 is permanently connected to a ring gear of the second planetary gear set P2. By engaging a second gear-implementing shift element S2, the carrier E1 of the third planetary gear set P3 are rotationally fixable with respect to a housing GG. The second gear-implementing shift element S2 is designed as a form-locking shift element. By engaging a third gear-implementing shift element S3, a sun gear of the third planetary gear set P3 is rotationally fixable. By engaging a fourth gear-implementing shift element S4, a ring gear of the first planetary gear set P1 is rotationally fixable. By engaging a fifth gear-implementing shift element S5, the ring gear of the first planetary gear set P1 is connectable to a sun gear of the second planetary gear set P2. By engaging a sixth gear-implementing shift element S6, the sun gear of the second planetary gear set P2 is connectable to the carrier of the first planetary gear set P1. The first as well as the third through sixth gear-implementing shift elements S1, S3, S4, S5, S6 are designed as force-locking shift elements. The rotor R of the electric machine EM is permanently connected to a sun gear E1 of the first planetary gear set P1, and is connectable to the input shaft GW1 by engaging an auxiliary shift element ZS. The auxiliary shift element ZS is designed as a form-locking shift element.

FIG. 2 shows a shift pattern for the transmission G according to the first exemplary embodiment. In the rows of the shift pattern, forward gears 1 through 8, one reverse gear 1R, and six gear steps 1E1, 1E2, 1E3, 1E4, 1E5, 1E6 are indicated. In the columns of the shift pattern, a circle indicates which of the gear-implementing shift elements S1, S2, S3, S4, S5, S6 and the auxiliary shift element ZS are to be engaged in order to form the forward gears 1 through 8, the reverse gear 1R, and the gear stages 1E1, 1E2, 1E3, 1E4, 1E5, 1E6.

Figure 3:
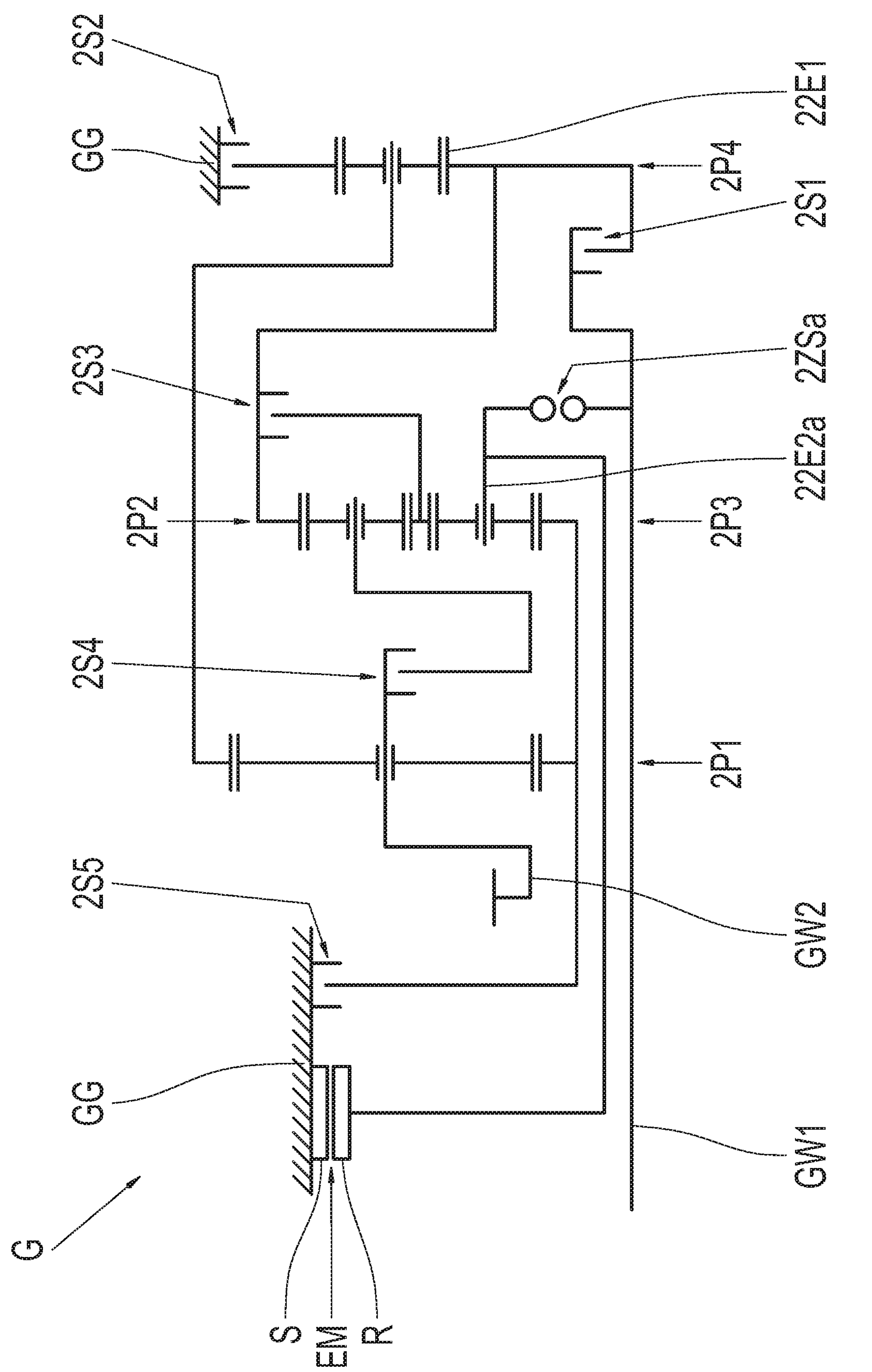
FIG. 3 and FIG. 4 show a transmission according to a second exemplary embodiment and a third exemplary embodiment of the invention, respectively.

FIG. 3 shows a transmission G according to a second exemplary embodiment of the invention. The transmission G includes an input shaft GW1, an output shaft GW2, a first planetary gear set 2P1, a second planetary gear set 2P2, a third planetary gear set 2P3, a fourth planetary gear set 2P4, and an electric machine EM.

The input shaft GW1 is not permanently connected to any of the four planetary gear sets 2P1, 2P2, 2P3, 2P4. Instead, the input shaft GW1 is connectable, via engagement of a first gear-implementing shift element 2S1, to a sun gear 22E1 of the fourth planetary gear set 2P4, which is permanently connected to a ring gear of the second planetary gear set 2P2. The output shaft GW2 is permanently connected to a carrier of the first planetary gear set 2P1. A sun gear of the first planetary gear set 2P1 is permanently connected to a sun gear of the third planetary gear set 2P3. A ring gear of the first planetary gear set 2P1 is permanently connected to a carrier of the fourth planetary gear set 2P4. A sun gear of the second planetary gear set 2P2 is permanently connected to a ring gear of the third planetary gear set 2P3. By engaging a second gear-implementing shift element 2S2, a ring gear of the fourth planetary gear set 2P4 is rotationally fixable with respect to a housing GG. By engaging a third gear-implementing shift element 2S3, two elements of the second planetary gear set 2P2 are connectable to each other, namely the sun gear and the ring gear in this case. By engaging a fourth gear-implementing shift element 2S4, a carrier of the second planetary gear set 2P2 is connectable to the carrier of the first planetary gear set 2P1. By engaging a fifth gear-implementing shift element 2S5, the sun gear of the first planetary gear set P1 is rotationally fixable. All gear-implementing shift elements 2S1 through 2S5 are designed as force-locking shift elements. A rotor R of the electric machine EM is permanently connected to a carrier 22E2*a* of the third planetary gear set P3, and is connectable to the input shaft GW1 by engaging an auxiliary shift element 2ZSa. The auxiliary shift element 2ZSa is designed as a form-locking shift element.

Figure 4:
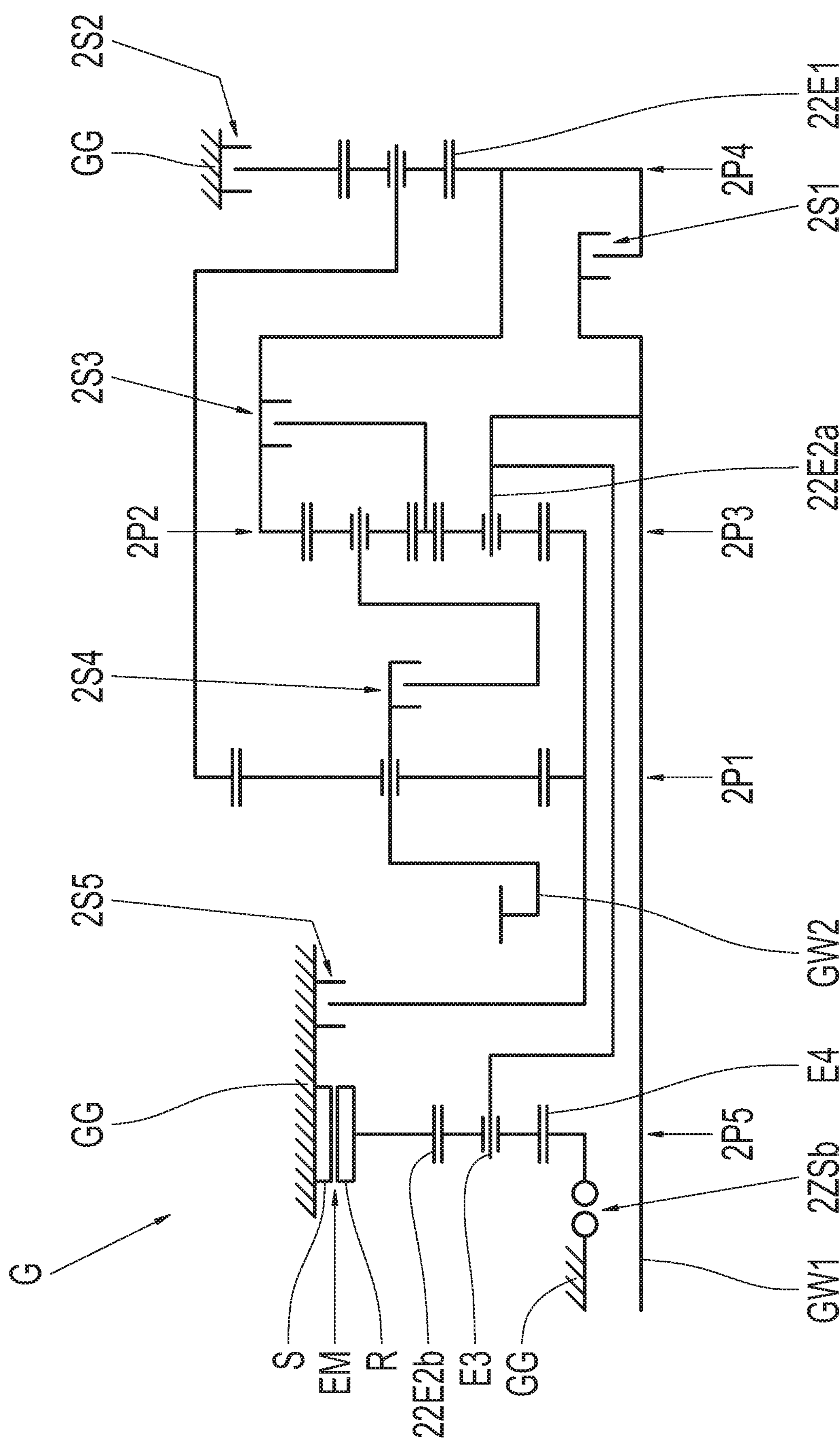

FIG. 4 shows a transmission G according to a third exemplary embodiment of the invention, which essentially corresponds to the second exemplary embodiment represented in FIG. 3. In this case, the transmission G includes, in addition to the four planetary gear sets 2P1, 2P2, 2P3, 2P4, a fifth planetary gear set 2P5. The input shaft GW1 is permanently connected, in this case, to the carrier of the third planetary gear set 2P3, which is permanently connected to a carrier E3 of the fifth planetary gear set 2P5. The rotor R is permanently connected, in this case, to a ring gear 22E2*b* of the fifth planetary gear set 2P5. By engaging an auxiliary shift element 2ZSb, a sun gear E4 of the fifth planetary gear set 2P5 is rotationally fixable with respect to the housing GG. By engaging the auxiliary shift element 2ZSb, a torque transmission is made possible between the sun gear E4, the carrier E3, and the ring gear 22E2*b* of the fifth planetary gear set 2P5. If the auxiliary shift element 2ZSb is engaged, a rotational speed of the rotor R is increased as compared to a rotational speed of the input shaft GW1.

FIG. 5 shows a shift pattern, which can be applied for the transmission G according to the second exemplary embodiment as well as for the transmission G according to the third exemplary embodiment. In the rows of the shift pattern, forward gears 21 through 28, one reverse gear 2R, and four gear steps 2E1, 2E2, 2E3, 2E4 are indicated. In the columns of the shift pattern, a circle indicates which of the gear-implementing shift elements 2S1, 2S2, 2S3, 2S4, 2S5 and the auxiliary shift element 2ZSa, 2ZSb are to be engaged in order to form the forward gears 21 through 28, the reverse gear 2R, and the gear stages 2E1, 2E2, 2E3, 2E4.

Figure 6:
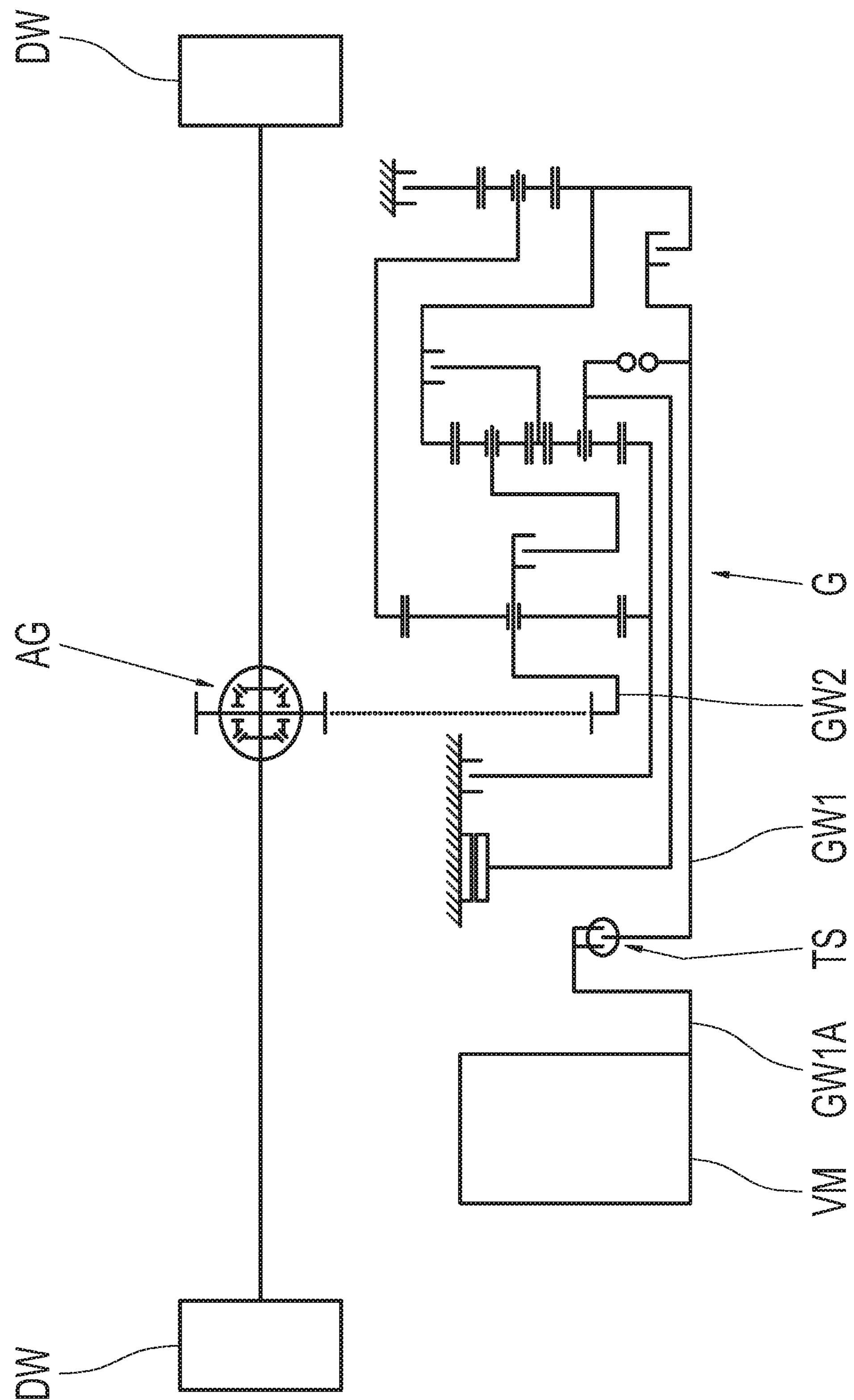
FIG. 6 shows a drive train for a motor vehicle.

FIG. 6 shows a drive train for a motor vehicle including a transmission G, which corresponds, by way of example, to the second exemplary embodiment represented in FIG. 3. The input shaft GW1 is connected, via a torsional vibration damper TS, to a torque-transmitting interface GW1A of the transmission G, and so the interface GW1A and the input shaft GW1 are torsionally elastically connected. The interface GW1A can be designed, for example, as a spline or as a flange, to which a crankshaft of a transmission-external internal combustion engine VM can be connected. The output shaft GW2 of the transmission G is operatively connected to a differential gear AG, via which the power present at the output shaft GW2 is distributed to driving wheels DW of the motor vehicle.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS

G transmission
GW1 input shaft
GW2 output shaft
GW1A interface
EM electric machine
S stator
R rotor
P1 first planetary gear set
P2 second planetary gear set
P3 third planetary gear set
E1 element
E2 element
S1 first gear-implementing shift element
S2 second gear-implementing shift element
S3 third gear-implementing shift element
S4 fourth gear-implementing shift element
S5 fifth gear-implementing shift element
ZS auxiliary shift element
1 to 8 gear
1R gear
1E1 to 1E6 gear step
2P1 first planetary gear set
2P2 second planetary gear set
2P3 third planetary gear set
2P4 fourth planetary gear set
2P5 fifth planetary gear set
22E1 element
22E2*a* element
22E2*b* element
E4 element
E5 element
21 to 28 gear
2R gear
2E1 to 1E4 gear step
2ZSa, 2ZSb auxiliary shift element
VM internal combustion engine
TS torsional vibration damper
AG differential gear
DW driving wheel

The invention claimed is:

1. A transmission (G) for a motor vehicle, comprising:
an input shaft (GW1);
an output shaft (GW2);
an electric machine (EM);
a torque-transmitting interface (GW1A) to a transmission-external internal combustion engine (VM); and
a plurality of planetary gear sets (P1-P3; 2P1-2P5),
wherein the transmission (G) is configured for providing a plurality of gears (1-8, 1R; 21-28, 2R) between the input shaft (GW1) and the output shaft (GW2) via selective engagement of gear-implementing shift elements (S1-S6; 2S1-2S5),
wherein the torque-transmitting interface (GW1A) is connected to the input shaft (GW1) in a permanently rotationally fixed manner or torsionally elastic manner,
wherein, by actuating a first force-locking shift element of the gear-implementing shift elements (S1, 2S1) having a variable torque transmission capacity, the input shaft (GW1) and a first element (E1, 22E1) of the planetary gear sets (P3; 2P4) are engageable to fix a rotational speed relationship between the input shaft (GW1) and the first element (E1, 22E1) of the planetary gear sets (P3; 2P4),
wherein a second element (E2, 22E2*a*, 22E2*b*) of the planetary gear sets (P1, 2P3, 2P5) is permanently connected to a rotor (R) of the electric machine (EM),
wherein an auxiliary form-locking shift element (ZS, 2ZSa, 2ZSb) is configured such that actuation of the auxiliary form-locking shift element (ZS, 2ZSa, 2ZSb) establishes a fixed rotational speed relationship between the rotor (R) and the input shaft (GW1),
wherein the transmission has a permanent connection between the input shaft (GW1) and a third element (E3) of the planetary gear sets (2P5),
wherein, by engaging the auxiliary shift element (2ZSb), a fourth element (E4) of the planetary gear sets (2P5) is rotationally fixable, and
wherein the third and fourth elements are both elements of one of the planetary gear sets (2P5).

2. The transmission (G) of claim 1, wherein the second, third, and fourth elements are all elements of the one of the planetary gear sets (2P5).

3. A drive train for a motor vehicle, comprising the transmission (G) of claim 1.

4. A method for operating the transmission (G) of claim 1, comprising forming a plurality of gears (1-8, 1R; 21-28, 2R) between the input shaft (GW1) and the output shaft (GW2) via selective engagement of the gear-implementing shift elements (S1-S6; 2S1-2S5), wherein the auxiliary shift element (ZS, 2ZSa, 2ZSb) is engaged in each of the plurality of gears (1-8, 1R; 21-28, 2R).

5. A method for operating the transmission (G) of claim 1, comprising forming at least one gear step (1E1, 1E2, 1E3, 1E4, 1E5, 1E6; 2E1, 2E2, 2E3, 2E4) between the rotor (R) and the output shaft (GW2) via selective engagement of a subset of the gear-implementing shift elements (S1-S6; 2S1-2S5), wherein the auxiliary shift element (ZS, 2ZSa, 2ZSb) is disengaged in the at least one gear step (1E1, 1E2, 1E3, 1E4, 1E5, 1E6; 2E1, 2E2, 2E3, 2E4).

6. The method of claim 5, wherein multiple gear steps (1E1, 1E2, 1E3, 1E4, 1E5, 1E6; 2E1, 2E2, 2E3, 2E4) are formable between the rotor (R) and the output shaft (GW2) via selective engagement of the subset of the gear-implementing shift elements (S1-S6; 2S1-2S5), wherein the auxiliary shift element (ZS, 2ZSa, 2ZSb) is disengaged in each gear step of the multiple gear steps (1E1, 1E2, 1E3, 1E4, 1E5, 1E6; 2E1, 2E2, 2E3, 2E4).

7. The method of claim 5, further comprising accelerating an internal combustion engine (VM) connected to the input shaft (GW1) of the transmission (G) in a torsionally elastic manner from a stationary condition to a starting speed beginning from an operation of the transmission (G) in the at least one gear step (1E1, 1E2, 1E3, 1E4, 1E5, 1E6; 2E1, 2E2, 2E3, 2E4) by at least partially engaging the first force-locking shift element (S1, 2S1).

8. The method of claim 7, further comprising, after the internal combustion engine (VM) accelerates to the starting speed, completely engaging the first force-locking shift element (S1, 2S1) only after engagement of the auxiliary shift element (ZS, 2ZSa, 2ZSb).

9. The method of claim 8, wherein completely engaging the first force-locking shift element (S1, 2S1) comprises completely engaging the first force-locking shift element (S1, 2S1) during a gear change operation of the transmission (G), another one of the gear-implementing shift elements (S2-S6, 2S2-2S5) disengaging during the gear change operation.

10. The method of claim 7, further comprising:

after the internal combustion engine (VM) accelerates to the starting speed, completely engaging the first force-locking shift element; and subsequently, disengaging another one of the gear-implementing shift elements (S2-S6, 2S2-2S5) involved in the at least one gear step (1E1, 1E2, 1E3, 1E4, 1E5, 1E6; 2E1, 2E2, 2E3, 2E4).

11. A method for operating a transmission (G) that comprises an input shaft (GW1), an output shaft (GW2), an electric machine (EM), a torque-transmitting interface (GW1A) to a transmission-external internal combustion engine (VM), and a plurality of planetary gear sets (P1-P3; 2P1-2P5), the transmission (G) is configured for providing a plurality of gears (1-8, 1R; 21-28, 2R) between the input shaft (GW1) and the output shaft (GW2) via selective engagement of gear-implementing shift elements (S1-S6; 2S1-2S5), the torque-transmitting interface (GW1A) is connected to the input shaft (GW1) in a permanently rotationally fixed manner or torsionally elastic manner, the input shaft (GW1) and a first element (E1, 22E1) of the planetary gear sets (P3; 2P4) are engageable to fix a rotational speed relationship between the input shaft (GW1) and the first element (E1, 22E1) of the planetary gear sets (P3; 2P4) by actuating a first force-locking shift element of the gear-implementing shift elements (S1, 2S1) having a variable torque transmission capacity, a second element (E2, 22E2*a*, 22E2*b*) of the planetary gear sets (P1, 2P3, 2P5) is permanently connected to a rotor (R) of the electric machine (EM), and an auxiliary form-locking shift element (ZS, 2ZSa, 2ZSb) is configured such that actuation of the auxiliary form-locking shift element (ZS, 2ZSa, 2ZSb) establishes a fixed rotational speed relationship between the rotor (R) and the input shaft (GW1), the method comprising:

forming a plurality of gears (1-8, 1R; 21-28, 2R) between the input shaft (GW1) and the output shaft (GW2) via selective engagement of the gear-implementing shift elements (S1-S6; 2S1-2S5), wherein the auxiliary shift element (ZS, 2ZSa, 2ZSb) is engaged in each of the plurality of gears (1-8, 1R; 21-28, 2R).

12. The method of claim 11, further comprising:

forming at least one gear step (1E1, 1E2, 1E3, 1E4, 1E5, 1E6; 2E1, 2E2, 2E3, 2E4) between the rotor (R) and the output shaft (GW2) via selective engagement of a subset of the gear-implementing shift elements (S1-S6; 2S1-2S5), wherein the auxiliary shift element (ZS, 2ZSa, 2ZSb) is disengaged in the at least one gear step (1E1, 1E2, 1E3, 1E4, 1E5, 1E6; 2E1, 2E2, 2E3, 2E4).

* * * * *